United States Patent
Irizarry-Lugo

(10) Patent No.: US 9,144,353 B2
(45) Date of Patent: Sep. 29, 2015

(54) WATERLESS AIR SUCTION TOILET

(75) Inventor: Franklin Irizarry-Lugo, Guayanilla, PR (US)

(73) Assignee: Franklin Irizarry-Lugo, Guayanilla, PR (US)

( * ) Notice: Subject to any disclaimer, the term of this patent is extended or adjusted under 35 U.S.C. 154(b) by 1372 days.

(21) Appl. No.: 12/720,905

(22) Filed: Mar. 10, 2010

(65) Prior Publication Data

US 2010/0275363 A1    Nov. 4, 2010

Related U.S. Application Data

(60) Provisional application No. 61/209,685, filed on Mar. 11, 2009.

(51) Int. Cl.
*A47K 11/06* (2006.01)
*A47K 11/02* (2006.01)

(52) U.S. Cl.
CPC ...................................... *A47K 11/02* (2013.01)

(58) Field of Classification Search
USPC ............... 4/482, 483, 321, DIG. 12, 319, 320
See application file for complete search history.

(56) References Cited

U.S. PATENT DOCUMENTS

| 4,285,719 | A | * | 8/1981 | Criss | 71/13 |
| 4,346,002 | A | | 8/1982 | Petzinger | |
| 4,627,116 | A | * | 12/1986 | Shimizu | 4/111.6 |
| 5,058,218 | A | | 10/1991 | Lobbert | |
| 5,177,819 | A | | 1/1993 | Lobbert | |
| 5,193,231 | A | * | 3/1993 | Stender | 4/449 |
| 5,887,290 | A | | 3/1999 | Nian | |
| 5,901,385 | A | * | 5/1999 | Nian | 4/484 |
| 6,101,641 | A | * | 8/2000 | Hawkins et al. | 4/484 |
| 6,335,192 | B1 | * | 1/2002 | Ostbo | 435/290.1 |
| 6,977,005 | B2 | | 12/2005 | Erdmann et al. | |
| 2005/0074292 | A1 | * | 4/2005 | Brookshire et al. | 405/129.95 |
| 2008/0222785 | A1 | * | 9/2008 | Irizarry-Lugo | 4/483 |

* cited by examiner

*Primary Examiner* — Lauren Crane
(74) *Attorney, Agent, or Firm* — Nils H. Ljungman & Associates

(57) ABSTRACT

A toilet that does not require water but suctioned air for use. Which may preferably be operated by two 12 VDC batteries which may be used at home or which may be used at campers, parks, rental facilities, civilian or military vehicles on land, sea or air, etc. Having an air suction device and biodegradable bags for catching such human waste and a method for disposing of said bags. Such toilet has an air suction device that can be attached or detached from body of toilet.

11 Claims, 11 Drawing Sheets

WATERLESS AIR SUCTION TOILET

BACKGROUND OF INVENTION

1. Technical Field

This application relates to a toilet that does not require water, but suctioned air for use; which may be fixed to replace existing toilets at home, or which may be portable such as those used in industrial or recreation sites or those used by rental industries. This application further relates to a toilet that uses an air suction device for waste removal and waste bags made of biodegradable materials to catch and to dispose of such human waste bags. It also relates to a toilet that operates by a solar energy system composed of a solar panel, and two 12 VDC batteries.

2. Background of Invention

Water conservation has become a mayor environmental issue in the past few decades. Everyday, humans use millions of gallons of water, a good deal of which is flushed down toilets. Human beings are therefore needlessly wasting one of our planet's most precious resources. Water is necessary to sustain all life on the planet, yet we use so much of it to dispose of our own waste.

Further, many countries in this world do not have access to running water. People in these countries are forced to dispose of their waste in the same areas that they must also live. Most of the world's rural population has no piped water supply and must rely upon pit latrines for sewage disposal. Pit latrines are holes in the ground which are sited, usually at some distance, away from a residence. When a latrine's capacity has been reached, it is abandoned and a new pit is dug at another site. Latrines provide no sewage treatment and rely upon soakage into the earth for the dispersal of liquids. As the population generally relies on shallow wells or surface water for drinking purposes, there is the ever present risk of disease spreading from contaminated water throughout the community.

In addition to the above, there are some instances where running water simply isn't available. For instance, water is typically not available at a campground or a portable toilet, which are set up at various locations, such as at construction sites or public parks. It would therefore be advantageous for all of the above situations to have a toilet that does not require the use of running water, and which is easily and conveniently maintained and is also friendly to the environment.

U.S. Pat. No. 5,052,218, entitled "Waterless toilet", teaches a waterless toilet that ensures operation with no need for the user to seal a used container, remove it, and insert a new one. The invention is intended to operate automatically by means of appropriate drive mechanisms and components and to provide each user with a ready-to-use and hygienic toilet. It is therefore not meant to be portable.

U.S. Pat. No. 5,887,290, entitled "Waterless toilet system", teaches a waterless toilet that uses a motor-driven crushing and separating machine designed to cut bags and waste matter into pieces, and separate solid matter from water.

U.S. Pat. No. 5,177,819, entitled "Waterless toilet with containers with lids for waste" also teaches a waterless toilet, but offers no methods of disposal of used waste bags.

U.S. Pat. No. 4,285,719, entitled "Organic material recycling method and device" teaches a method and device for disposing of human waste or other types of refuse. Once disposed of into a tank, the waste is then broken down by several means including the use of bacteria and warms.

BRIEF SUMMARY OF THE INVENTION

This application relates to a toilet that is composed of two different versions: Waterless Air Suction Toilet A and Waterless Air Suction Toilet B. This two different versions of the same waterless air suction toilet do not use water, but suctioned air for operating. Both versions of waterless air suction toilet can be attached or fixed to floor to replace old toilets or can be portable toilets such as industrial rentable toilets to be used in parks, recreation and construction sites, civilian and military vehicles, vessels, etc. Waterless Air Suction Toilet A has an air suction device located inside rear of the body of toilet.

Waterless Air Suction Toilet B has a separated and detached air suction device to suction and to remove waste bags from toilet. It also relates to a toilet that uses biodegradable bags for disposing of human waste and a method for disposing of such bags. Both toilets A and B mimic regular home toilets and occupy the same base space of such toilets. The disposal of waste is compatible with the actual one provided minor changes on the structures. This toilet gets' its electric energy by a solar panel and two 12 VDC Batteries or home electric current.

How the waterless air suction toilet works: A biodegradable bag is put inside bowl of toilet. Once the user finishes using the toilet, he or she pushes an electric switch to start the air suction device. Once toilet is empty, the switch goes off. Toilet is left clean and odorless. A no return air valves located under the bowl, prevents gases to return to toilet. The use of bags could be optional.

If the user pushes the switch at the time to use the toilet, suctioning air will get rid of any human waste instantly and no waste will remain in the bowl of toilet, provided the user sprays anti-stick substance in the bowl before using it.

According to at least one possible embodiment, a means and method for disposal of the biodegradable bags and human waste may be installed outside near the house, as close to it as possible. A possible embodiment of the disposal system could be a pipe connected to the front hole of the toilet by one end of pipe and to the receiving waste tank of the system by the other end, in such a way that when the air suction device is activated the bag and waste is pulled via the pipe into the receiving tank. Another pipe is connected from the opposite stop side of tank to the rear hole of the toilet base for the suctioned air to complete its suction and expulsion of air to atmosphere cycle.

In one possible embodiment the pipes should be coated with a non-stick material to prevent the coating of waste inside walls of such pipes.

One no return air valve should be placed on the low part of toilet bowl. Another no return air valve should be placed on the air suction pipe as close to tank bi composing chamber as possible. These two no air return valves will prevent that backflow of gases get into house. If one fails the other should continue to operate.

After falling inside tank the waste bag or waste could then sit in a decomposing chamber. While in the decomposing chamber, the waste may begin to decompose and break down on its own: In another possible embodiment a bacterial agent or other decomposing agent may be added to the discomposing chamber to help break down the biodegradable bag and the waste contained there in. In the toilet B the suction device is located outside of toilet, but its function is the same as toilet A.

BRIEF DESCRIPTION OF DRAWINGS

FIG. 2-A represents an open biodegradable bag to be used inside the bowl of toilet.

DETAILED DESCRIPTION OF DRAWINGS

Figure 1:
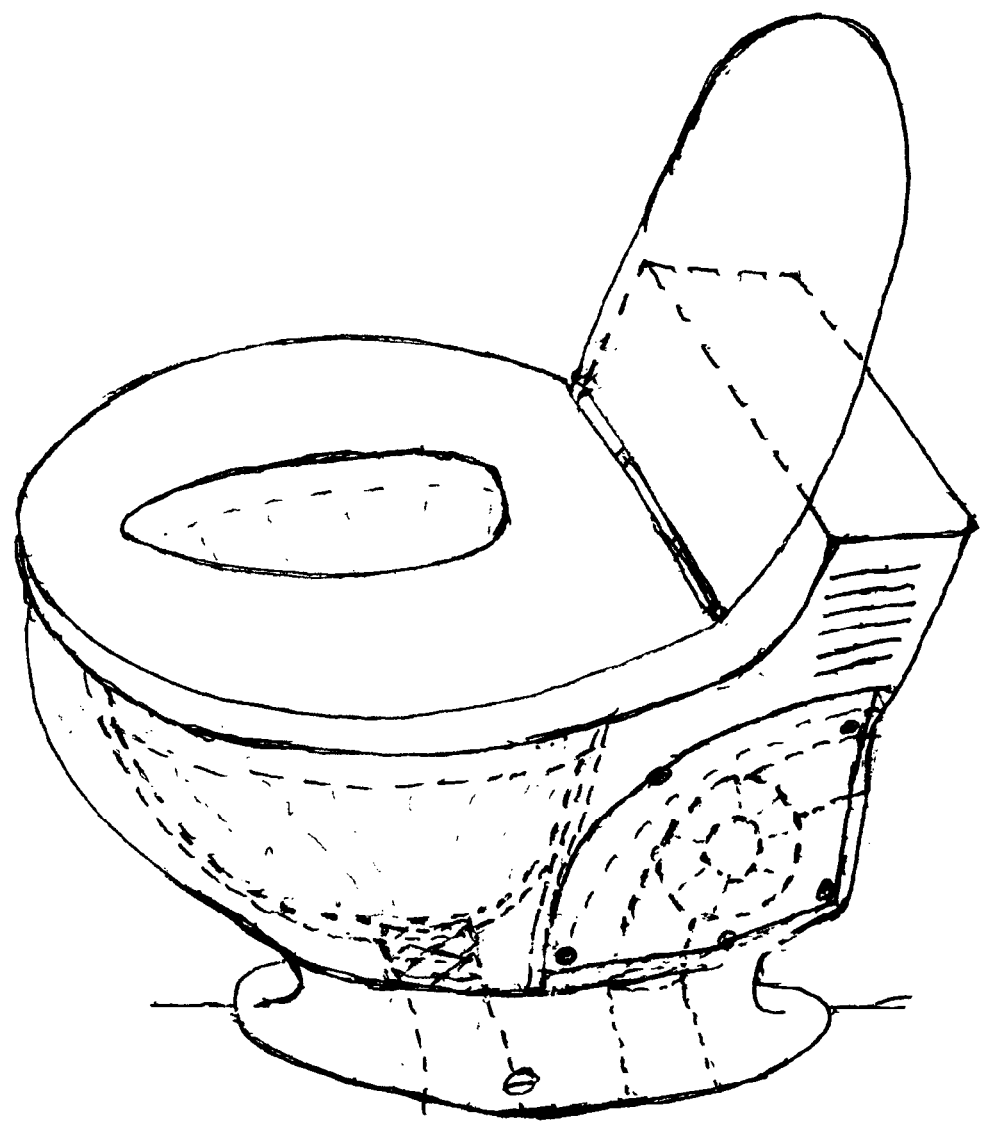
FIG. 1 shows a perspective view of a toilet with a bag installed inside the toilet bowl, a no return air valve and an air suction device installed inside rear or toilet according to at least one embodiment.

FIG. 1 shows a perspective view of a toilet with a bag installed inside the toilet bowl, a no return air valve and an air suction device installed inside rear or toilet according to at least one embodiment. The toilet has an open biodegradable bag according to at least one possible embodiment.

Figures 2, 2A:
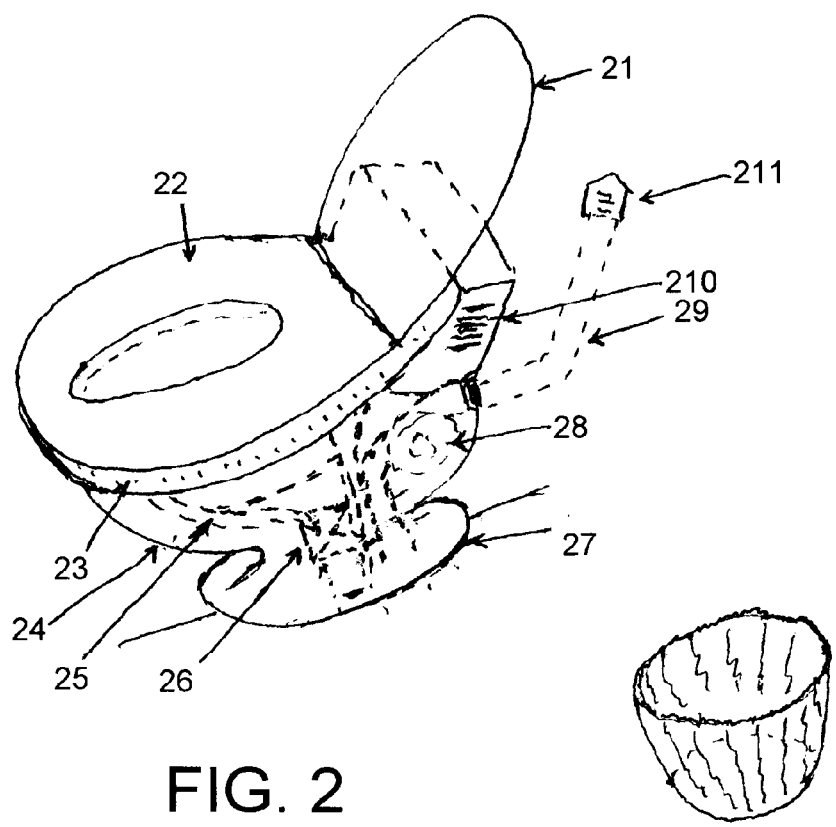
FIG. 2 shows a perspective view of a waterless air suction toilet.

FIG. 2 shows a perspective view of a waterless air suction toilet. The toilet has a toilet cover 21, a toilet seat 22, a hollow border 23 with little holes or cavities for air to move down into bowl to push bag 25 inside waste tank, a toilet body 24, and a biodegradable bag 25 where human waste will catch in its way to waste tank. The toilet also has a no return air valve 26 to prevent gases from returning into room and a base 27 in which there are two different holes. An air suction device 28 is located inside the rear of toilet. This is the machine that will suction waste into tank. An air suction pipe 29 expels air out of waste tank. Air vents 210 are located on rear sides of toilet. An air filter 211 cleans the air before it is dispersed into atmosphere.

FIG. 2-A represents an open biodegradable bag to be used inside the bowl of toilet. It is an accordion type bag, similar to those used in coffee making machines. It will catch human waste later to be suctioned into tank.

Figure 3:
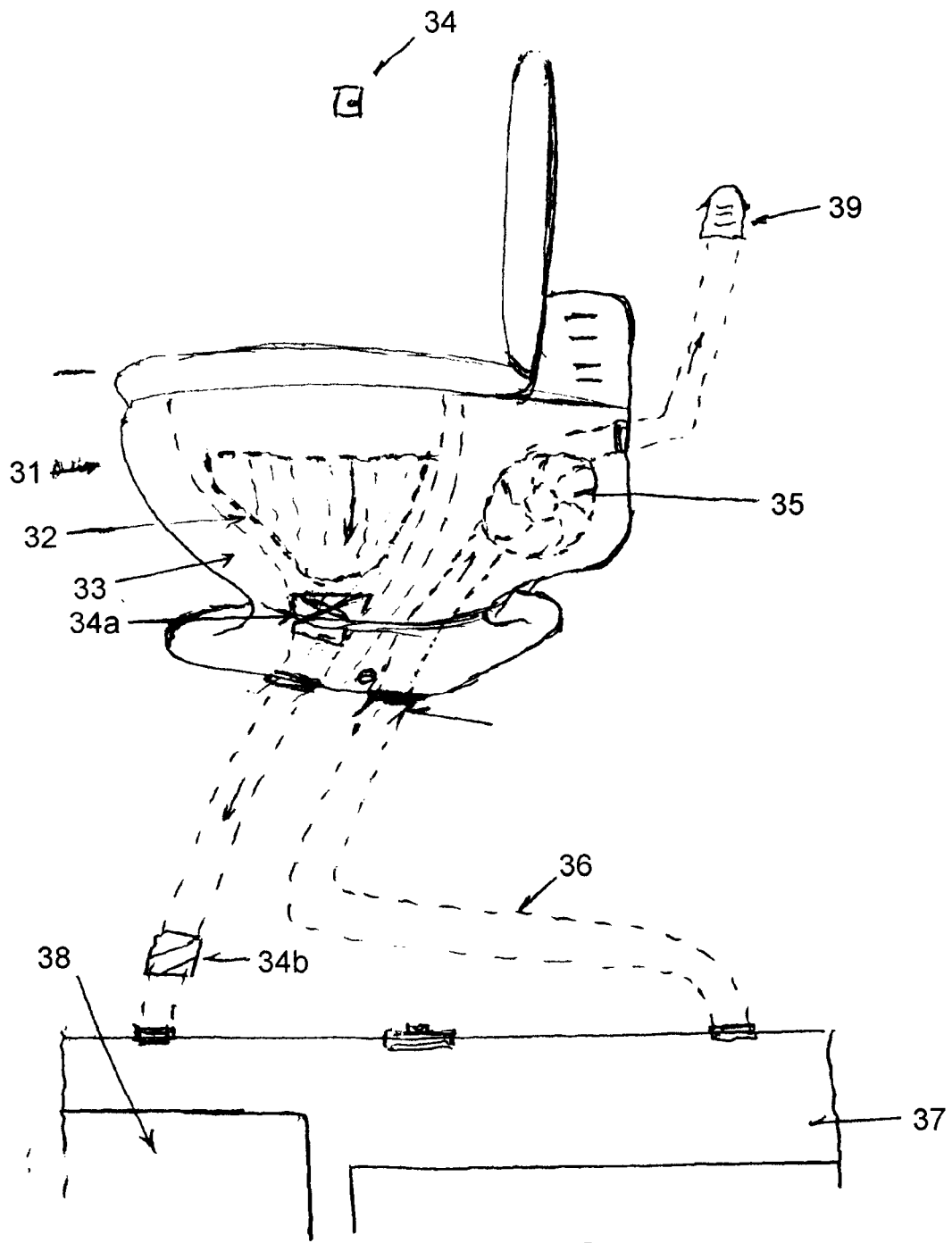
FIG. 3 represents the way waterless air suction toilet operates.

FIG. 3 represents the way waterless air suction toilet operates. The user puts a biodegradable bag 32 inside the toilet bowl 33. Then he or she sits on the toilet 31 and uses it. Once finished the user press a 12 VDC switch 34. This could be solar energy or 12 VDC from a transformer 120 ACT 12 VDC for safety. Immediately the air suction device 35 is activated. Its starts to suction air from waste tank 37 via pipe 36. This action creates a vacuum. Inside tank the biodegradable waste bag 32 is soft and offers little or no resistance to suction. So waste bag 32 is suctioned down and falls inside decomposing chamber 38 suctioned air is dispersed all around the tank 37. Free of debris air is suctioned by return pipe 36. Once outside of home an air filter 39 cleans the air and lets it disperse to atmosphere. A new bag is put inside the toilet bowl 33 and once again it is ready for use.

Users that for any reason do not want to use the biodegradable bags, they may simply spray an anti-stick substance available in any store into bowl, then he or she pushes the electric switch. Immediately all falling waste will be suctioned into tank.

Figure 4:
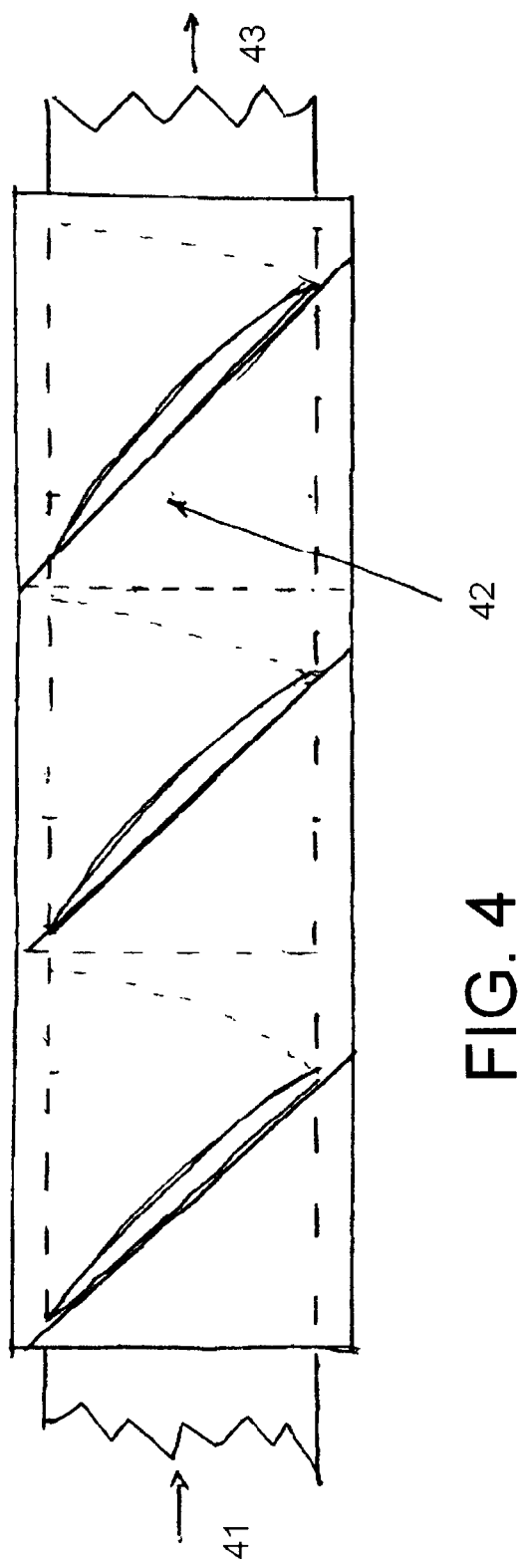
FIG. 4 represents a no return air valve.

FIG. 4 represents a no return air valve. An arrow 41 shows the way air and waste bag goes down into decomposing chamber. The no return air valve has an interior 42. It shows three different tongs. If any one of them doesn't work, the others will keep air and odors out of home. They open when suctioned air moves, into tank and closes when the air suction device goes off. An arrow 43 shows the continue movement of air and waste.

Figure 5:
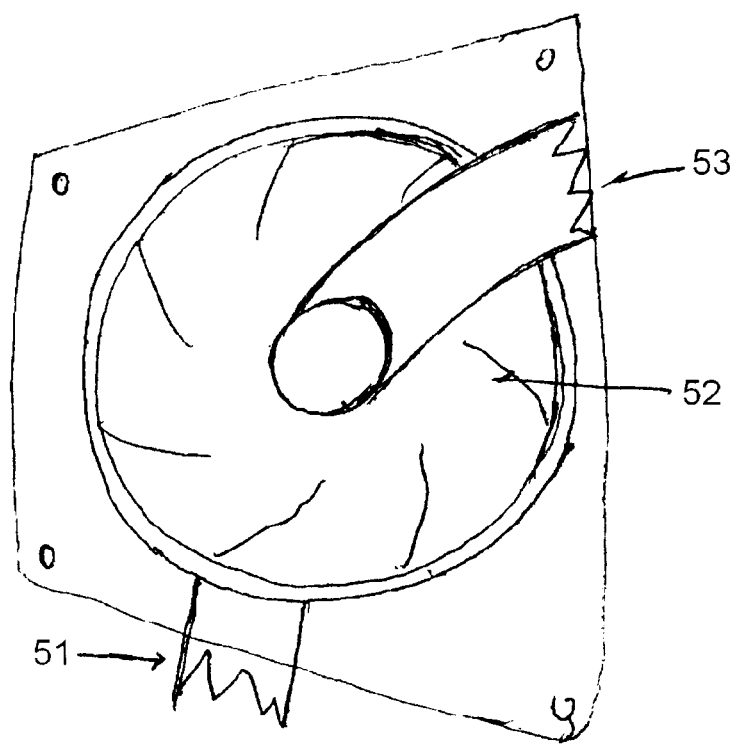
FIG. 5 represents a suction arrangement.

FIG. 5 shows a suction arrangement having a suction pipe 51 that gets air from waste tank. An air suction device 52 suctions air and pushes it out (Toilet A). An exhaust pipe 53 carries incoming air to atmosphere. An interior casing 54 is inside rear of toilet, where air suction device is located.

Figure 6:
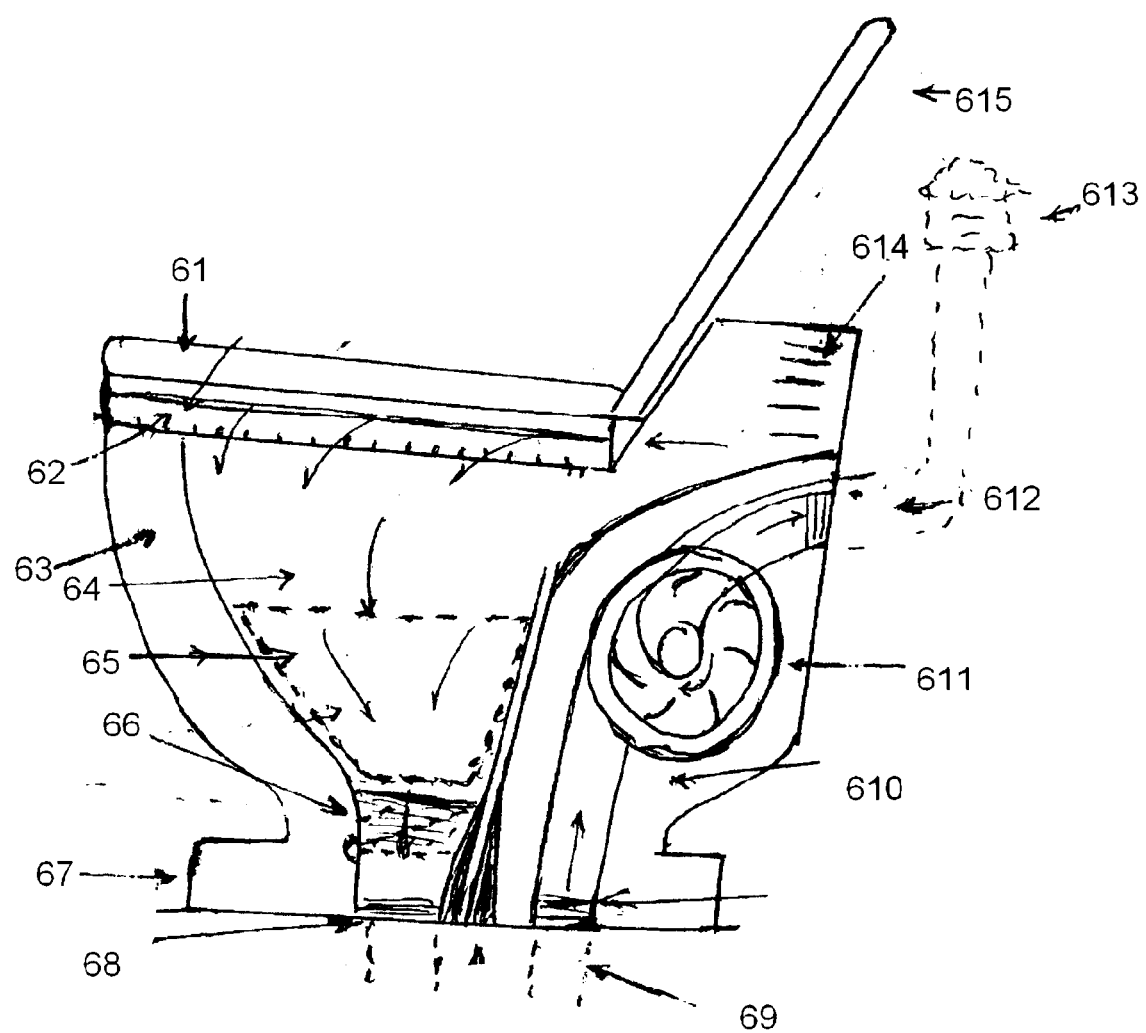
FIG. 6 represents how the waterless air suction toilet should look if it was to be cut in halves from its front to rear.

FIG. 6 represents how the waterless air suction toilet should look if it was to be cut in halves from its front to rear. There is a seat 61, a hollow top with little cavities under top 62, a bowl 63, an inside of bowl 64, a biodegradable bag 65 inside bowl, a no return air valve 66 located inside bowl below waste bag, a toilet base 67 with two holes 68, 69, and a toilet cover 615. A casing or space 610 is where air suction device 611 is located. There is also an exhaust pipe 612, an air filter 613 that cleans air before it is dispersed into atmosphere, air vents 614 on left, right, and rear sides of toilet which provide air needed to move waste into tank.

Figure 7:
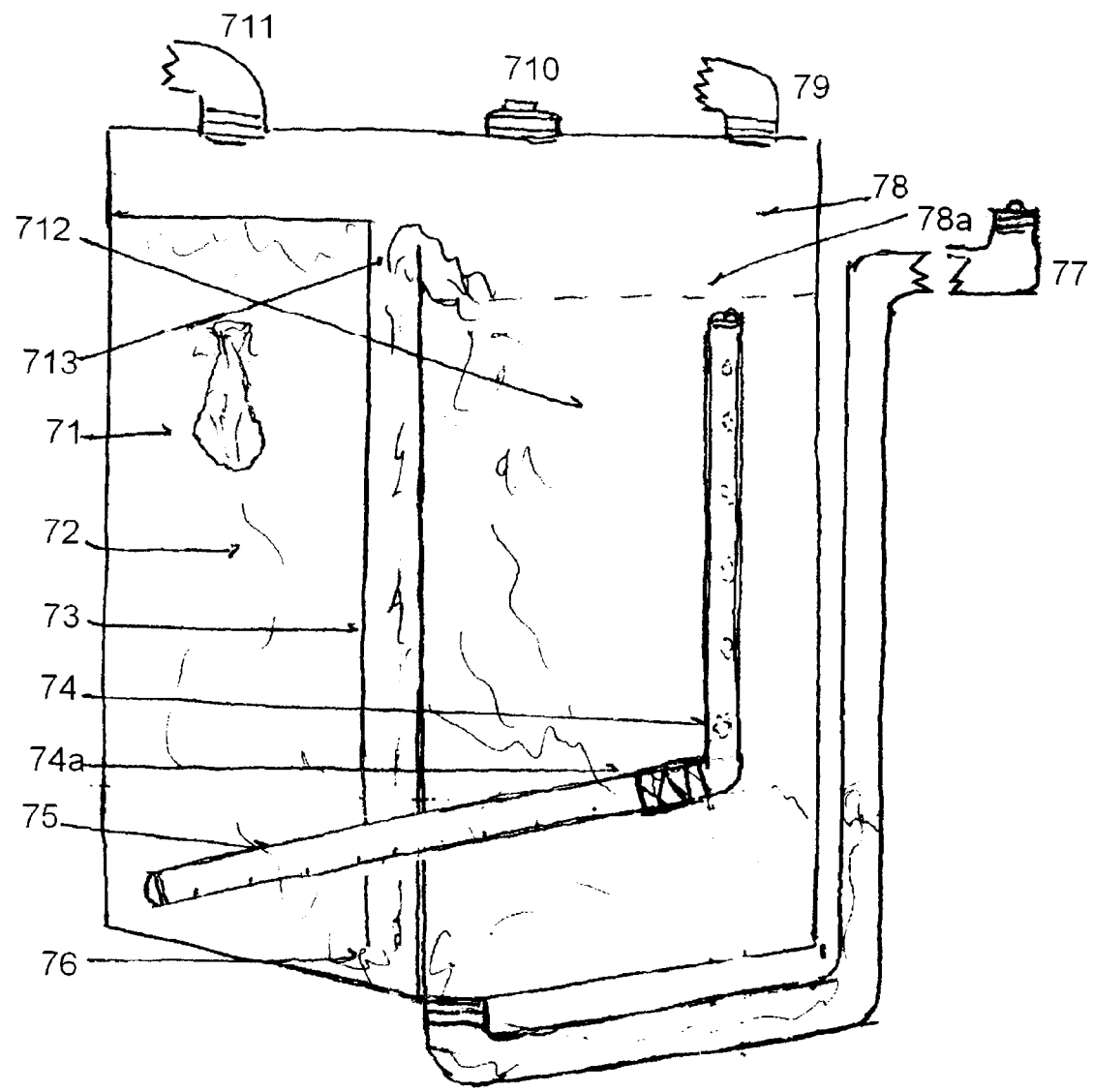
FIG. 7 represents a blown up version of the tank system for waste disposal.

FIG. 7 represents a blown up version of the tank system for waste disposal. There is a waste bag 71 and air getting inside waste tank. The tank system has a waste decomposing chamber 72, double separating walls 73 of about 4 to 6 inches separation between walls, and a floor 76 on waste decomposing chamber 72. When chamber 72 is full waste it begins to over flow. It moves between the separate double walls 73 to get from the decomposing chamber to the main tank 712. When waste level reaches the high mark 78A its ready to be empty by pipe 77. Air 78 is to be suctioned by pipe 79 to get out to atmosphere, action that suctions waste from toilet and into decomposing chamber. The system has an emergency plug 710 in case of problems if pipe 77 is plugged by waste. Entry 711 is where waste from toilet gets into tank 712. A pipe 74 by the main tank 72 is attached to it by nipples. These nipples permit that excess of urine or water to escape out of tank into underground. A no liquid return valve 74A keeps rain water or other outside liquids from getting inside tank. An extension pipe 75 with holes or cavities permits liquids to escape out into underground. There is an overflow 713 of semi-treated waste.

Figure 8:
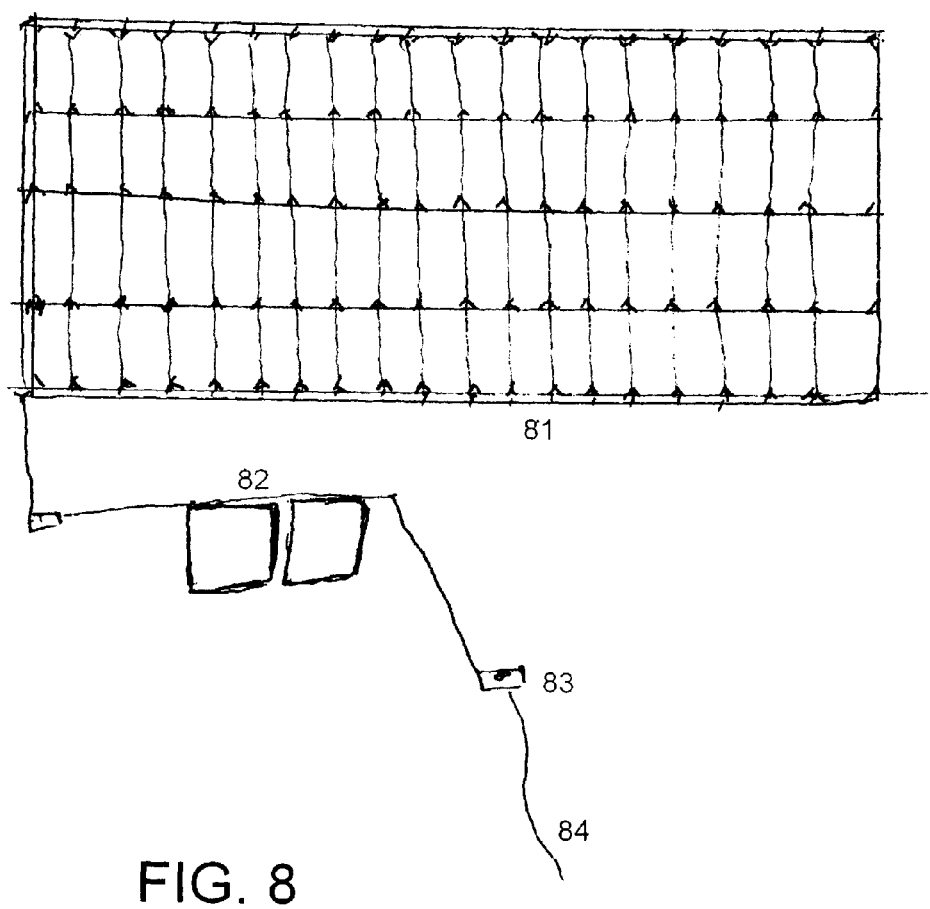
FIG. 8 shows a solar energy system.

FIG. 8 shows a solar energy system. A solar panel 81 that will convert sun light into electric energy. Two 12 VDC batteries 82 are to be charged by solar energy panel 81. A 12 VDC electric line 83 provides energy to the air suction device (see FIG. 3) and switch to start such air suction device. Negative and positive wires 84 contact the air suction device.

Figure 9:
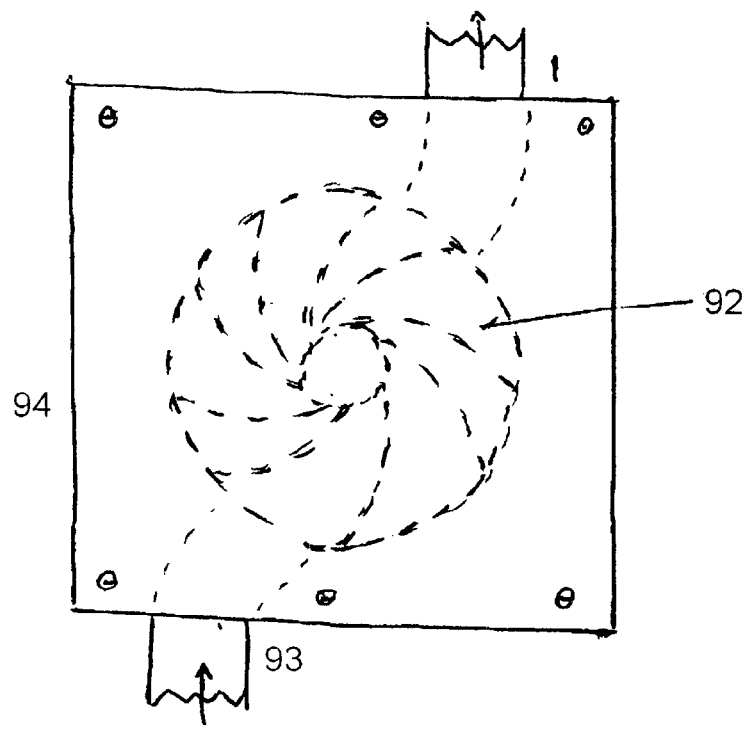
FIG. 9 shows an air suction device detached away from toilet but that can be attached on top of the tank, on the roof or any other higher monument nearby the waste tank.

FIG. 9 shows an air suction device detached away from toilet but that can be attached on top of the tank, on the roof or any other higher monument nearby the waste tank. Arrow 91 shows suctioned air pipe for air to be expelled out to atmosphere. Also shown are the interior parts 92 of an air suction device that is detached from toilet B, and a pipe 93 that is to be attached to waste tank for air to be suctioned out of tank into atmosphere.

Figure 10:
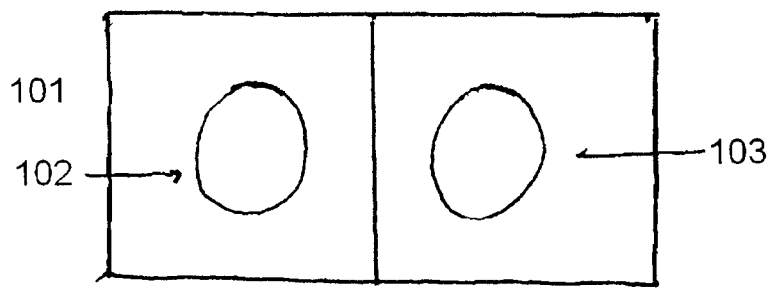
FIG. 10 represents the base of toilet A.

FIG. 10 represents the base 101 of toilet A with two holes: a front hole 102 that receives waste to be suctioned into tank, and a second hole 103 from where air inside waste tank is removed by the air suction device into atmosphere.

Figure 11:
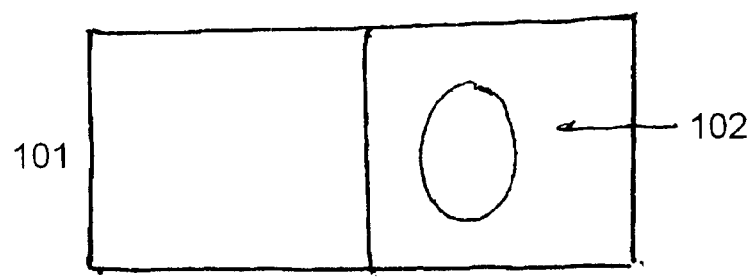
FIG. 11 represents the base of toilet B.

FIG. 11 shows the base of toilet B, which has only one hole 112.

Figure 12:
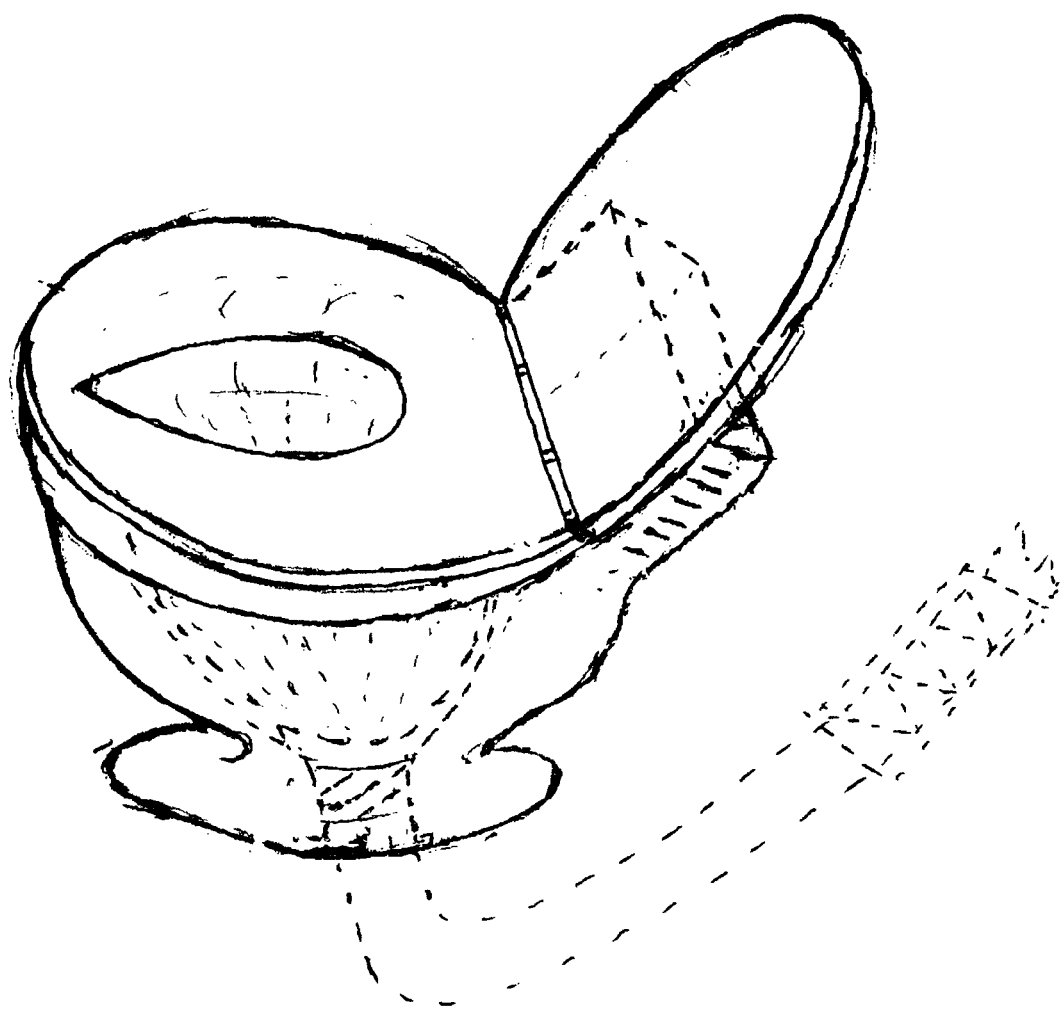
FIG. 12 shows toilet B ready for use.

FIG. 12 shows toilet B ready for use.

One feature or aspect of an embodiment is believed at the time of the filing of this patent application to possible reside broadly in a waterless air suction toilet having a disposable biodegradable bag for catching human waste for disposal.

Such waterless air suction toilet comprising: a toilet bowl, a base, a lid that is configured to be opened and closed; a seat that is configured to be hinged so that the seat may be lifted up away from the body of the toilet.

Another feature of such bowl is to have a no return air valve located below the interior end of bowl.

Yet another embodiment of such waterless air suction toilet at the time of this application for patent to possibly resides in an air suction device located inside rear of toilet such as toilet A. The base of such toilet is composed of two holes. The front hole is for disposal of human waste. The second hole is for suctioned air to get out from waste tank to atmosphere.

Yet one more embodiment of such waterless air suction toilet is a toilet with one single hole in the base for waste removal by an air suction device located outside and detached from the body of the toilet such as toilet B.

An additional embodiment of said waterless air suction toilet at the time of this patent application resides on a solar panel and two 12 VDC batteries that will be charged by such solar panel to be used to provide power for air suction device to operate at no cost for energy.

Another feature or aspect of an embodiment is believed at the time of filling of this patent application to possible reside broadly in a method of disposal for disposing of said biodegradables bags and waste. Said method of disposal comprising: an underground tank system for waste disposal. Said waste disposing tank system for waste disposal comprising: a decomposing tank; a finishing tank; and a suction pipe for taking waste from the finishing tank to the street level to be collected by a waste disposal truck.

Please note that any measurements or dimensions included herein and in the accompanying figures are simply included as possible embodiment. These measurements or dimensions should not be construed as limiting the claims to only these measurements or dimensions described in the application. It should further be understood that additional possible embodiments having different measurements and dimensions not explicitly described herein may be possible within the scope of the possible embodiments described herein.

Some examples of treatment for waste which may possibly be utilized or adapted for use in at least one possible embodiment may possibly be found in the following U.S. Pat. No. 5,746,919, entitled "Temperature-phased anaerobic waste treatment process," U.S. Pat. No. 5,525,288, entitled "Temperature-phased anaerobic waste treatment process;" U.S. Pat. No. 4,664,803, entitled "Anaerobic treatment of waste water;" U.S. Pat. No. 4,415,453, entitled "Anaerobic treatment" U.S. Pat. No. 4,372,856, entitled "Process and system for anaerobic treatment of waste," U.S. Pat. No. 4,366,059, entitled "Anaerobic treatment" and U.S. Pat. No. 4,315,823, entitled "Anaerobic treatment."

The details in the patents, patent applications and publications may be considered to be incomparable, at applicant's option, into the claims during prosecution as further limitations in the claims to patentable distinguish any amended claims from any applied prior art. The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application.

However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of septic tanks or septic tank systems which may possibly be used or adapted for use in at least one possible embodiment may possibly be found in the following U.S. Pat. No. 6,649,060, entitled "Septic tank having a support system and mold for manufacturing same;" U.S. Pat. No. 6,558,535, entitled "Residential septic tank with seams above sewage line and residential septic tank with stepped ribs;" U.S. Pat. No. 6,551,508, entitled, "Septic tank waste water filter including a reservoir for filtered waste water; No. 6,495,040, entitled "Septic tank filtering system;" U.S. Pat. No. 6,482,319, entitled "In-line filtration system for treatment of septic tank effluent;" U.S. Pat. No. 6,440,304, entitled "In-line filtration system for treatment of septic tank effluent;" U.S. Pat. No. 6,331,247, entitled "Septic tank filtering system;" No. 6,319,873, entitled "Biological activator for a septic tank;" U.S. Pat. No. 6,306,304, entitled "Aerobic treatment of septic tank effluent" U.S. Pat. No. 6,280,614, entitled "Residential septic tank;" U.S. Pat. No. 6,231,764, entitled "Septic tank pump arrangement including a self-cleaning rotary strainer;" U.S. Pat. No. 6,136,190, entitled "Septic tank filtering system;" and No. 4,882,046, entitled "Multi-chamber septic assembly."

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

The components disclosed in the various publications, disclosed or incorporated by reference herein, may be used in the embodiments of the present invention, as well as equivalents thereof.

Some examples of biodegradable plastic which may be used or adapted for use in at least one possible embodiment may possibly be found in the following U.S. Pat. No. 6,569,990, entitled "Plastic articles comprising biodegradable PHA copolymers;" U.S. Pat. No. 6,437,022, entitled "Composition for molding biodegradable plastic, biodegradable plastic obtained there from, method of molding the same, and use of biodegradable plastic;" U.S. Pat. No. 6,107,378, entitled "Biodegradable plastic composition;" U.S. Pat. No. 6,083,621, entitled "Biodegradable plastic product made from coconut husk powder mixture;" U.S. Pat. No. 5,961,906, entitled "Biodegradable and compostable plastic articles, including flat shaped articles;" U.S. Pat. No. 5,948,848, entitled "Biodegradable plastic material and a method for its manufacture," U.S. Pat. No. 5,861,461, entitled "Biodegradable plastic composition, method for preparing there of and product prepared there from;" U.S. Pat. No. 5,736,586, entitled "Biodegradable foamed plastic materials;" U.S. Pat. No. 5,618,855, entitled "Biodegradable copolymers and plastic articles comprising biodegradable copolymers;" U.S. Pat. No. 5,505,830, entitled "Biodegradable compostable plastic and method of making the same;" No. 5,401,778, entitled "Biodegradable plastic composition and biodegradable plastic shaped body;" U.S. Pat. No. 5,378,738, entitled "Biodegradable plastic;" U.S. Pat. No. 5,376,708, entitled "Biodegradable plastic materials, method of producing them, and their use;" U.S. Pat. No. 5,346,929, entitled "Biodegradable plastic and articles made therefrom;" No. 5,227,415, entitled "Biodegradable plastic composition;" and No. 5,124,371, entitled "Biodegradable plastic composition, biodegradable plastic shaped body and method of producing same".

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application.

However, the description of the object or objects may not be completely applicable to the claims as originally filed in this patent application, as amended during prosecution of this patent application, and as ultimately allowed in any patent issuing from the patent application. Therefore, any statements made relating to the object or objects are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

Some examples of toilet bowls that may possibly be utilized or adapted for use in at least one possible embodiment may possibly be found in the following U.S. Pat. Nos. D483,447, entitled "Toilet bowl;" No. D480,456, entitled "Toilet bowl," No. D439,639, entitled "Toilet bowl;" No. D422,064, entitled "Toilet bowl;" No. D360,936, entitled "Toilet bowl;" No. D359,548, entitled "Toilet bowl;" No. D355,711, entitled "Toilet bowl;" No. D355,709, entitled "Toilet bowl;" and No. D351,222, entitled "Toilet bowl."

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

All or substantially all of the components and methods of the various embodiments may be used with at least one embodiment or all the embodiments, if more than one embodiment is described herein.

Some examples of suction systems which may possibly be utilized or adapted for use in at least one possible embodiment may be found the following U.S. Pat. No. 6,557,511, entitled "Suction system;" U.S. Pat. No. 6,192,850, entitled "Suction system;" U.S. Pat. No. 6,158,926, entitled "Suction system for urban wastes and for recycling materials;" U.S. Pat. No. 6,097,778, entitled "Gravity driven suction pump system, methods, and apparatus;" U.S. Pat. No. 5,935,439, entitled "Suction system with end supported internal core tube suction strainers;" and U.S. Pat. No. 5,261,897, entitled "Portable suction system."

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as filled in this patent application, allowed in any patent issuing from this patent application. Therefore, the title is not intended to limit the claims in any manner and should not be interpreted as limiting the claims in any manner.

Some examples of non-stick or repellent coatings which may possibly be utilized or adapted for use in at least one possible embodiment may possibly be found in the following U.S. Pat. No. 6,641,870, entitled "Ink, paint, pollutant, bioorganism, oil, water, and/or dirt repellent coating:" U.S. Pat. No. 6,579,620, entitled "Water-repellent coating and coating film:" U.S. Pat. No. 5,824,421, entitled "Oil- and water-repellent coating composition;" U.S. Pat. No. 5,616,388, entitled "Water repellent coating:" U.S. Pat. No. 5,134,203, entitled "Crosslink able compositions and their use in the production of coatings which repel sticky substances:" U.S. Pat. No. 4,617,057, entitled "Oil and water repellent coating compositions:" U.S. Pat. No. 4,600,735, entitled "Soil-repellent coating composition:" and U.S. Pat. No. 3,940,359, entitled "Soil-repellent coating compositions."

The abstract of the disclosure is submitted herewith as required by 37 C.F.R. 1.72(b). As stated in 37 C.F.R. 1.72(b): "A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims."

Therefore, the abstract is not intended to limit the claims in any manner and should not be interpreted as limiting the claims in any manner.

The embodiments as described herein above in the context of the embodiments are not to be taken as being limited to all of the provided details thereof, since modifications and variations thereof may be made without departing from the spirit and scope of the embodiments.

There are many air suctions devices and many air blower devices already patented and available on the market. Some of them will be select and adapted during the air suction device.

There are many no water return valves already patented and available on the market some of them will be select and adapted during the development and manufacture of the air waterless air suction device.

There are many no air return valves already patented on the market. Some of them will be select and adapted to be used during the development and manufacturing of the air waterless air suction toilet.

There are many solar panels and solar batteries already patented. Some of them will be select and adapted during the development manufacturing of the air waterless air suction toilet.

There are many air filtering devices already patented. Some of them will be select and adapted during the development manufacturing of the air waterless air suction toilet.

What is claimed is:

1. A waterless air suction toilet arrangement comprising:
   a toilet bowl configured to hold a biodegradable bag configured to catch human waste;

said toilet bowl comprising a hollow border top;
said hollow border top comprising air flow holes around the perimeter thereof;
said bowl comprising a no return air valve in an opening in the bottom of said bowl;
a base comprising: a front hole connected to said opening for disposal of biodegradable bags containing human waste into a waste tank, and a rear hole for suctioned air to move out of the waste tank;
a lid configured to be opened and closed;
a hinged seat configured to be lifted up and away from the body of the toilet;
a hollow, rear portion being completely separated by a solid wall from the front half of said toilet;
said rear portion comprising air vents for air circulation, which air vents are disposed on left, right and rear of an upper part of said rear portion; and
said rear portion comprising an exhaust hole configured to connect to an air exhaust pipe to permit flow of air out to atmosphere, which exhaust hole is disposed on a lower part of said rear portion.

2. The waterless air suction toilet arrangement according to claim 1, further comprising an air suction device disposed in said rear portion and configured to conduct air from the waste tank and out said exhaust hole in said rear portion.

3. The waterless air suction toilet arrangement according to claim 2, further comprising a 12 VDC solar panel to charge two 12 VDC batteries to power said waterless air suction toilet.

4. The waterless air suction toilet arrangement according to claim 1, further comprising a 12 VDC solar panel to charge two 12 VDC batteries to power said waterless air suction toilet.

5. The waterless air suction toilet arrangement according to claim 2, wherein the waste tank is an underground waste tank.

6. The waterless air suction toilet arrangement according to claim 3, wherein the waste tank is an underground waste tank.

7. The waterless air suction toilet arrangement according to claim 4, wherein the waste tank is an underground waste tank arrangement configured to receive biodegradable bags containing human waste, wherein said waste tank arrangement comprises:
a decomposing chamber;
a main tank;
an emergency plug located on top of said main tank;
a suction pipe for conducting waste and waste bags from said main tank to street level to be collected by a waste disposal truck;
a first pipe connected from said front hole of said base to said decomposing chamber;
a second no air return valve disposed near the end of said first pipe;
a second pipe connected alongside of said main tank from top to bottom with nipples at intervals so excess liquid comprising water or urine is controlled by permitting excess liquid to be self dispersed around underground outside of said waste tank arrangement;
a no return liquid valve disposed at the bottom of said second pipe to prevent outside liquids from entering into said main tank;
an extension pipe connected to said no return liquid valve; and
said extension pipe comprises small holes or cavities configured to permit excess liquids to exit said main tank, but prevent outside liquids from entering said main tank.

8. A method of using a waterless air suction toilet arrangement comprising: a toilet bowl configured to hold a biodegradable bag configured to catch human waste; said toilet bowl comprising a hollow border top; said hollow border top comprising air flow holes around the perimeter thereof; said bowl comprising a no return air valve in an opening in the bottom of said bowl; a base comprising: a front hole connected to said opening for disposal of biodegradable bags containing human waste into a waste tank, and a rear hole for suctioned air to move out of the waste tank; a lid configured to be opened and closed; a hinged seat configured to be lifted up and away from the body of the toilet; a hollow, rear portion being completely separated by a solid wall from the front half of said toilet; said rear portion comprising air vents for air circulation, which air vents are disposed on left, right and rear of an upper part of said rear portion; and said rear portion comprising an exhaust hole configured to connect to an air exhaust pipe to permit flow of air out to atmosphere, which exhaust hole is disposed on a lower part of said rear portion;
said method comprising suctioning a biodegradable bag containing human waste through said opening in said bowl, past said no return air valve, through said front hole, and into the waste tank.

9. The method according to claim 8, wherein said waterless air suction toilet arrangement further comprises an air suction device disposed in said rear portion and configured to conduct air from the waste tank and out said exhaust hole in said rear portion, and said method further comprises using said air suction device to conduct air from the waste tank and out said exhaust hole in said rear portion.

10. The method of using a waterless air suction toilet arrangement according to claim 8, wherein said waterless air suction toilet arrangement comprises the waste tank arrangement comprising: a decomposing chamber; a main tank; an emergency plug located on top of said main tank; a suction pipe for conducting waste and waste bags from said main tank to street level to be collected by a waste disposal truck; a first pipe connected from said front hole of said base to said decomposing chamber; a second no air return valve disposed near the end of said first pipe; a second pipe connected alongside of said main tank from top to bottom with nipples at intervals so excess liquid comprising water or urine is controlled by permitting excess liquid to be self dispersed around underground outside of said waste tank arrangement; a no return liquid valve disposed at the bottom of said second pipe; an extension pipe connected to said no return liquid valve; and said extension pipe comprises small holes or cavities configured to permit excess liquids to exit said main tank, but prevent outside liquids from entering said main tank;
said method comprises conducting waste and waste bags from said main tank to a waste disposal truck, which waste and waste bags can then be treated, disposed of, or recycled and converted into industrial material or fertilizers.

11. A method of using a waterless air suction toilet arrangement, wherein said waterless air suction toilet arrangement comprises a waterless air suction toilet and a waste tank arrangement comprising: a decomposing chamber; a main tank; an emergency plug located on top of said main tank; a suction pipe for conducting waste and waste bags from said main tank to street level to be collected by a waste disposal truck; a first pipe connected from said waterless air suction toilet to said decomposing chamber; a no air return valve disposed near the end of said first pipe; a second pipe connected alongside of said main tank from top to bottom with nipples at intervals so excess liquid comprising water or urine is controlled by permitting excess liquid to be self dispersed around underground outside of said waste tank arrangement; a no return liquid valve disposed at the bottom of said second pipe to prevent outside liquids from entering into said main tank; an extension pipe connected to said no return liquid valve; and said extension pipe comprises small holes or cavities configured to permit excess liquids to exit said main tank, but prevent outside liquids from entering said main tank;

said method comprising suctioning waste bags containing human waste into said main tank, then conducting waste and waste bags from said main tank to the waste disposal truck, which waste and waste bags can then be treated, disposed of, or recycled and converted into industrial material or fertilizers.

* * * * *